US011663437B2

(12) United States Patent
Matsumoto et al.

(10) Patent No.: US 11,663,437 B2
(45) Date of Patent: May 30, 2023

(54) LIGHT EMITTING APPARATUS RECOGNITION SYSTEM AND LIGHT EMITTING APPARATUS

(71) Applicant: FUJIFILM BUSINESS INNOVATION CORP., Tokyo (JP)

(72) Inventors: Daisuke Matsumoto, Kanagawa (JP); Shingo Uchihashi, Kanagawa (JP); Atsushi Ito, Kanagawa (JP); Kazutoshi Ikeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 366 days.

(21) Appl. No.: 16/929,763

(22) Filed: Jul. 15, 2020

(65) Prior Publication Data

US 2021/0255713 A1 Aug. 19, 2021

(30) Foreign Application Priority Data

Feb. 19, 2020 (JP) .............................. JP2020-025809

(51) Int. Cl.
| | | |
|---|---|---|
| *G06K 19/07* | (2006.01) | |
| *G06F 3/03* | (2006.01) | |
| *H04N 7/18* | (2006.01) | |
| *G06V 20/20* | (2022.01) | |
| *G06V 10/141* | (2022.01) | |
| *G06V 10/143* | (2022.01) | |

(52) U.S. Cl.
CPC ....... *G06K 19/0728* (2013.01); *G06F 3/0308* (2013.01); *G06V 10/141* (2022.01); *G06V 10/143* (2022.01); *G06V 20/20* (2022.01); *H04N 7/188* (2013.01)

(58) Field of Classification Search
CPC ....... G06F 3/0308; G06V 20/20; H04N 7/188
USPC .................................. 345/78, 173; 356/614
See application file for complete search history.

(56) References Cited

U.S. PATENT DOCUMENTS

| | | | |
|---|---|---|---|
| 2019/0230290 A1* | 7/2019 | Yasuda | ................... G03B 13/10 |
| 2020/0209982 A1* | 7/2020 | Kao | .......................... G01S 1/70 |

FOREIGN PATENT DOCUMENTS

| | | |
|---|---|---|
| JP | 2003-329762 A | 11/2003 |
| JP | 2010-217093 A | 9/2010 |
| JP | 2011-192236 A | 9/2011 |
| JP | 2016-71663 A | 5/2016 |

* cited by examiner

*Primary Examiner* — Calvin C Ma
(74) *Attorney, Agent, or Firm* — Oliff PLC

(57) ABSTRACT

A light emitting apparatus recognition system includes a light emitting apparatus, an image capturing apparatus, a recognition apparatus, and an electromagnetic wave emitting element. The light emitting apparatus includes a light source that blinks on the basis of identification information unique to the light emitting apparatus and an electromagnetic wave receiving element. The image capturing apparatus captures an image of light emitted by the light source of the light emitting apparatus. The recognition apparatus recognizes the light emitting apparatus on the basis of the light appearing in the image captured by the image capturing apparatus. The electromagnetic wave emitting element emits an electromagnetic wave from the image capturing apparatus or a vicinity of the image capturing apparatus. The electromagnetic wave receiving element receives the electromagnetic wave emitted by the electromagnetic wave emitting element.

19 Claims, 14 Drawing Sheets

LIGHT EMITTING APPARATUS RECOGNITION SYSTEM AND LIGHT EMITTING APPARATUS

CROSS-REFERENCE TO RELATED APPLICATIONS

This application is based on and claims priority under 35 USC 119 from Japanese Patent Application No. 2020-025809 filed Feb. 19, 2020.

BACKGROUND

(i) Technical Field

The present disclosure relates to a light emitting apparatus recognition system and a light emitting apparatus.

(ii) Related Art

There is a system including a light emitting apparatus and a camera. The light emitting apparatus (also referred to as a tag) is attached to a movable object, such as a person or an item, and includes a light source that blinks on the basis of unique identification information. The camera is an apparatus that captures an image of light emitted by the light source of the light emitting apparatus. The system identifies the light emitting apparatus on the basis of the light emitted by the light source of the light emitting apparatus and appearing in the image captured by the camera, and specifies the position of the light emitting apparatus. Hereinafter, this system will be referred to as a light emitting apparatus recognition system.

Japanese Unexamined Patent Application Publication No. 2016-71663 discloses a system including a tag and a camera for reading information of the tag. In this system, the camera emits infrared light toward the tag, the tag receives the infrared light and reflects the infrared light so as to include information of the tag by switching ON/OFF liquid crystal, and the camera receives the reflected infrared light and interprets the information of the tag.

Japanese Unexamined Patent Application Publication No. 2011-192236 discloses a system including a tag that emits light to transmit a tag identification value and a tag reader including an image capturing apparatus. In this system, the tag reader determines a light emission state of the tag by using image information of a predetermined portion in a frame read from the image capturing apparatus, and identifies the tag identification value in accordance with a determination result.

Japanese Unexamined Patent Application Publication No. 2003-329762 discloses a target localizing system including a light emitting unit that moves together with a target and emits an infrared ray, an image capturing unit that captures an infrared image of a predetermined region including the target, and a position specifying unit that specifies the position of the light emitting unit by using the infrared image.

Japanese Unexamined Patent Application Publication No. 2010-217093 discloses a system including a tag that transmits ID information of the tag by using a radio wave signal and transmits a light blink signal at the same time as or with a certain time difference from the radio wave signal, and a tag reader apparatus that receives the radio wave signal from the tag and captures an image of the tag. The tag reader apparatus calculates the position of the tag by using the position of the light blink signal in the captured image, and associates the ID information in the received radio wave signal with the position of the tag on the basis of a relationship between the timing when the light blink signal is received and the timing when the radio wave signal is received.

SUMMARY

In the light emitting apparatus recognition system, when the light emitting apparatus is away from the camera, the light of the light emitting apparatus looks small or the brightness thereof is low in the image captured by the camera, which makes it difficult to recognize the light emitting apparatus.

Aspects of non-limiting embodiments of the present disclosure relate to facilitating recognition of a light emitting apparatus compared to a case where the light emitting apparatus emits light regardless of the distance between the light emitting apparatus and an image capturing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a light emitting apparatus recognition system including a light emitting apparatus, an image capturing apparatus, a recognition apparatus, and an electromagnetic wave emitting element. The light emitting apparatus includes a light source that blinks on the basis of identification information unique to the light emitting apparatus. The image capturing apparatus captures an image of light emitted by the light source of the light emitting apparatus. The recognition apparatus recognizes the light emitting apparatus on the basis of the light appearing in the image captured by the image capturing apparatus. The electromagnetic wave emitting element emits an electromagnetic wave from the image capturing apparatus or a vicinity of the image capturing apparatus. The light emitting apparatus further includes an electromagnetic wave receiving element that receives the electromagnetic wave emitted by the electromagnetic wave emitting element. The light emitting apparatus changes a light emission intensity of the light source in accordance with an intensity of the electromagnetic wave received by the electromagnetic wave receiving element.

BRIEF DESCRIPTION OF THE DRAWINGS

Exemplary embodiments of the present disclosure will be described in detail based on the following figures, wherein.

DETAILED DESCRIPTION

Figure 1:
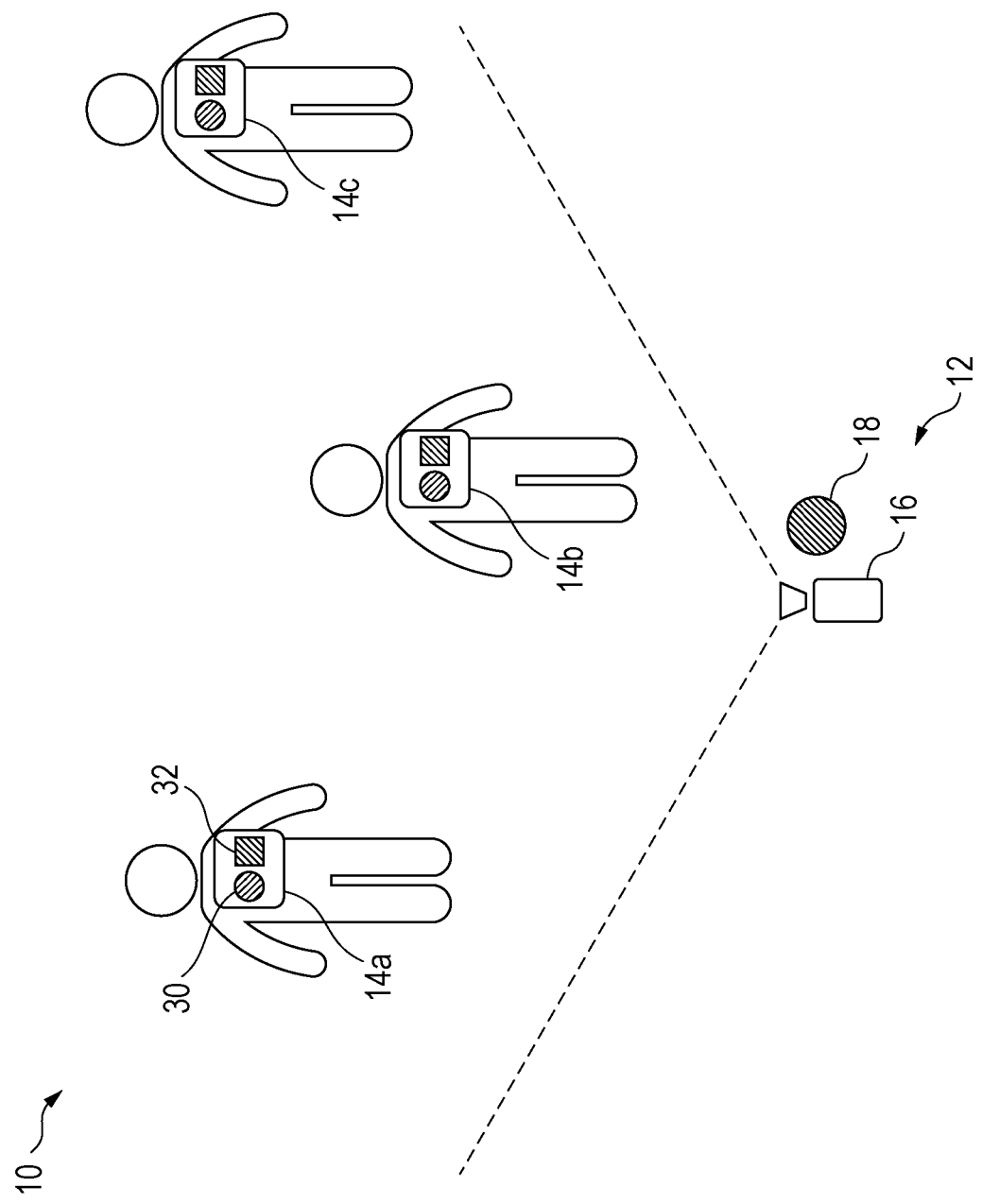
FIG. 1 is a diagram illustrating a schematic configuration of a tag recognition system according to an exemplary embodiment of the present disclosure.

Hereinafter, individual exemplary embodiments of the present disclosure will be described in detail with reference to the attached drawings. The configurations described below are examples for description and may be changed as appropriate in accordance with the specifications or the like of a system, an apparatus, or a member. In a case where there are plural exemplary embodiments, modification examples, or the like, use of the features thereof in appropriate combination is originally assumed. In all figures, the same components are denoted by the same reference numerals and a duplicate description will be omitted.

FIG. 1 is a diagram illustrating a schematic configuration of a tag recognition system 10 according to an exemplary embodiment of the present disclosure. The tag recognition system 10 includes tags 14a, 14b, and 14c and a camera 16. Each of the tags 14a, 14b, and 14c is a light emitting apparatus attached to a movable object, such as a person, an animal, or an item, and including a light source 30 that blinks on the basis of unique identification information. The camera 16 is an image capturing apparatus that captures an image of light emitted by the light sources 30 of the tags 14a, 14b, and 14c. The tag recognition system 10 identifies each of the tags 14a, 14b, and 14c on the basis of the light emitted by the light sources 30 of the tags 14a, 14b, and 14c and appearing in an image captured by the camera 16, and specifies the positions of the tags 14a, 14b, and 14c. The number of tags and the number of cameras are changed as appropriate.

FIG. 1 illustrates one usage style of the tag recognition system 10 in which the tags 14a, 14b, and 14c are attached to the chests of individual visitors in an exhibition area, the light sources 30 of the tags 14a, 14b, and 14c blink on the basis of pieces of identification information unique to the visitors, the tags 14a, 14b, and 14c attached to the chests of the visitors are identified on the basis of the light emitted by the light sources 30 of the tags 14a, 14b, and 14c and appearing in an image captured by the camera 16, and the positions of the individual visitors are specified. The position of each visitor is specified on the basis of the position of light emitted by the tag in a captured image, or on the basis of the position of a camera that captures an image of light emitted by the tag in a case where there are plural cameras. This usage style makes it possible to collect information indicating, for example, the booths in the exhibition area visited by the individual visitors and how long the visitors stayed there, and to acquire, for example, an information source for determining the targets in which the individual visitors are interested.

As another usage style, the tag recognition system 10 may be used to, for example, manage manufacturing of items. Tags are attached to intermediates that are sequentially processed in individual steps and transferred to the next step, light sources of the tags blink on the basis of pieces of identification information unique to the intermediates, the individual intermediates are identified on the basis of light emitted by the light sources of the tags and appearing in an image captured by a camera, and the positions of the intermediates are specified. This usage style makes it possible to specify, for example, the current steps in which the individual intermediates are being processed. The above-described usage styles are merely examples, and the usage style of the tag recognition system 10 is not limited.

Figure 2:
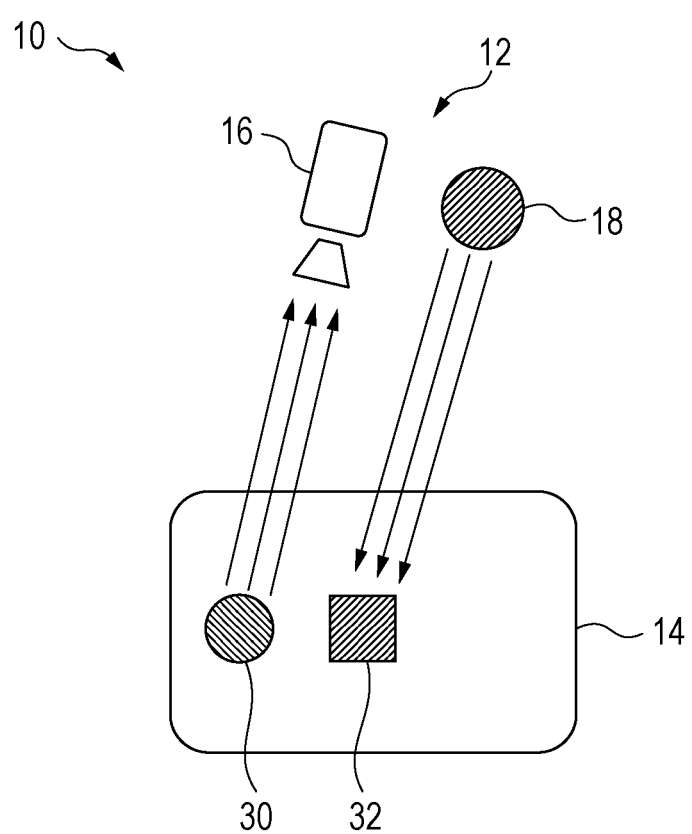
FIG. 2 is a diagram for describing the tag recognition system.

The tag recognition system 10 according to the present exemplary embodiment includes a for-distance light emitting element 18 that emits an infrared ray from the camera 16 or the vicinity of the camera 16. The for-distance light emitting element 18 is not limited to an element that emits an infrared ray but may be any element that emits an electromagnetic wave including visible light or the like. The camera 16 and the for-distance light emitting element 18 constitute a reader 12. As illustrated in FIG. 2, the tag 14 includes a for-distance light receiving element 32 that receives an infrared ray from the for-distance light emitting element 18. The for-distance light receiving element 32 is not limited to an element that receives an infrared ray but may be any element that receives an electromagnetic wave in a frequency band corresponding to the electromagnetic wave emitted by the for-distance light emitting element 18 that emits an electromagnetic wave including visible light or the like.

The tag 14 changes the light emission intensity of the light source 30 in accordance with the intensity of an infrared ray received by the for-distance light receiving element 32. In a case where the intensity of an infrared ray received by the for-distance light receiving element 32 of the tag 14 is low, it means that the distance between the tag 14 and the for-distance light emitting element 18 is long, in other words, the distance between the tag 14 and the camera 16 is long. On the other hand, in a case where the intensity of an infrared ray received by the for-distance light receiving element 32 of the tag 14 is high, it means that the distance between the tag 14 and the for-distance light emitting element 18 is short, in other words, the distance between the tag 14 and the camera 16 is short.

In a case where the intensity of an infrared ray received by the for-distance light receiving element 32 of the tag 14 is low, the light emission intensity of the light source 30 of the tag 14 may be increased to increase the size and brightness of light of the tag 14 in an image captured by the camera 16. That is, the intensity of light emitted by the tag 14 may be prevented from being too low, and the tag 14 may be easily recognized in the captured image.

On the other hand, in a case where the intensity of an infrared ray received by the for-distance light receiving element 32 of the tag 14 is high, the light emission intensity of the light source 30 of the tag 14 may be decreased to decrease the power consumption of the light source 30.

When the distance between the tag 14 and the camera 16 is short, the light emitted by the light source 30 of the tag 14 is recognizable in an image captured by the camera 16 even if the light emission intensity of the tag 14 is decreased, and the intensity of light emitted by the tag 14 may be prevented from being too high.

Figure 3:
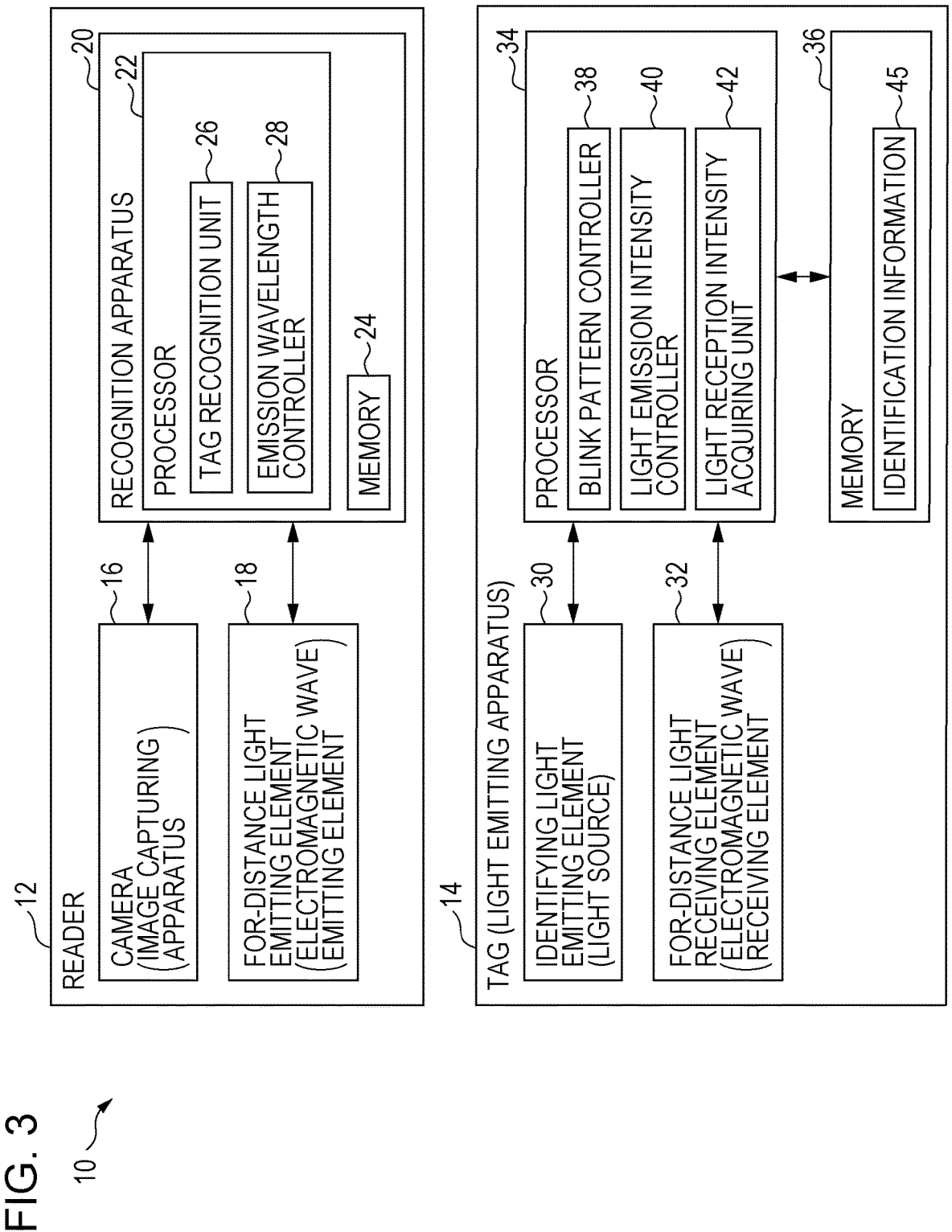
FIG. 3 is a block diagram of the tag recognition system.

FIG. 3 is a block diagram of the tag recognition system 10 according to the present exemplary embodiment. The tag recognition system 10 includes the tag 14 serving as a light emitting apparatus and the reader 12. The light source 30 of the tag 14 is an infrared light emitting element that emits an infrared ray. This light emitting element emits light in a blink pattern identifying the tag 14 and functions as an identifying light emitting element used to identify the tag 14 with the image thereof being captured by the camera 16 and analyzed. The camera 16 of the reader 12 is an infrared camera that captures an image of an infrared ray emitted by the light source 30 of the tag 14.

The tag 14 includes the light source 30 that blinks with an infrared ray on the basis of the identification information unique to the tag 14, the for-distance light receiving element 32 that receives an infrared ray from the for-distance light emitting element 18 of the reader 12, a processor 34 electrically connected to the light source 30 and the for-distance light receiving element 32, a memory 36 that stores identification information 45 or the like read out by the processor 34, and a battery (not illustrated) that supplies power to the individual components of the tag 14. The processor 34 functions as a light reception intensity acquiring unit 42 that acquires the light reception intensity of an infrared ray from the for-distance light emitting element 18 of the reader 12 received by the for-distance light receiving element 32, a light emission intensity controller 40 that controls the light emission intensity of the light source 30 on the basis of the light reception intensity acquired by the light reception intensity acquiring unit 42, and a blink pattern controller 38 that performs control to cause the light source 30 to blink in a blink pattern based on the identification information 45.

The reader 12 includes the camera 16 serving as an image capturing apparatus that captures an image of blink of the light source 30 that emits an infrared ray of the tag 14, the for-distance light emitting element 18 that emits an infrared ray from the camera 16 or the vicinity of the camera 16, and a recognition apparatus 20 that recognizes the tag 14 on the basis of an infrared ray, which is light emitted by the light source 30 of the tag 14 and appearing in an image captured by the camera 16.

The recognition apparatus 20 is electrically connected to the camera 16 and the for-distance light emitting element 18. The recognition apparatus 20 includes a processor 22 and a memory 24. The processor 22 sequentially acquires captured images transmitted by the camera 16 and stores the images in the memory 24. The memory 24 temporarily stores images captured by the camera 16 within a certain past period. The captured images can be acquired in the form of moving images and processed in units of frame images, each being a still image extracted as a frame in time series. The processor 22 functions as a tag recognition unit 26 that reads out a captured image from the memory 24, interprets blink of the light source 30 of the tag 14 appearing in the captured image to identify the tag 14, and specifies the position of the tag 14 on the basis of the position of light in the captured image. In addition, the processor 22 functions as an emission wavelength controller 28 that controls the wavelength of an infrared ray emitted by the for-distance light emitting element 18. In the present exemplary embodiment, the emission wavelength controller 28 is included in the recognition apparatus 20. Alternatively, the emission wavelength controller 28 may be included in an apparatus other than the recognition apparatus 20 and may be implemented by a processor or the like in the other apparatus.

The recognition apparatus 20 is not necessarily included in the reader 12. In a case where there are plural readers 12, one common recognition apparatus 20 may be provided for the plural readers 12. In a case where an image of the tag 14 is captured by plural cameras 16, the tag recognition unit 26 of the recognition apparatus 20 may specify the position of the tag 14 on the basis of the positions of the individual cameras 16 and the images captured by the individual cameras 16.

Figure 4:
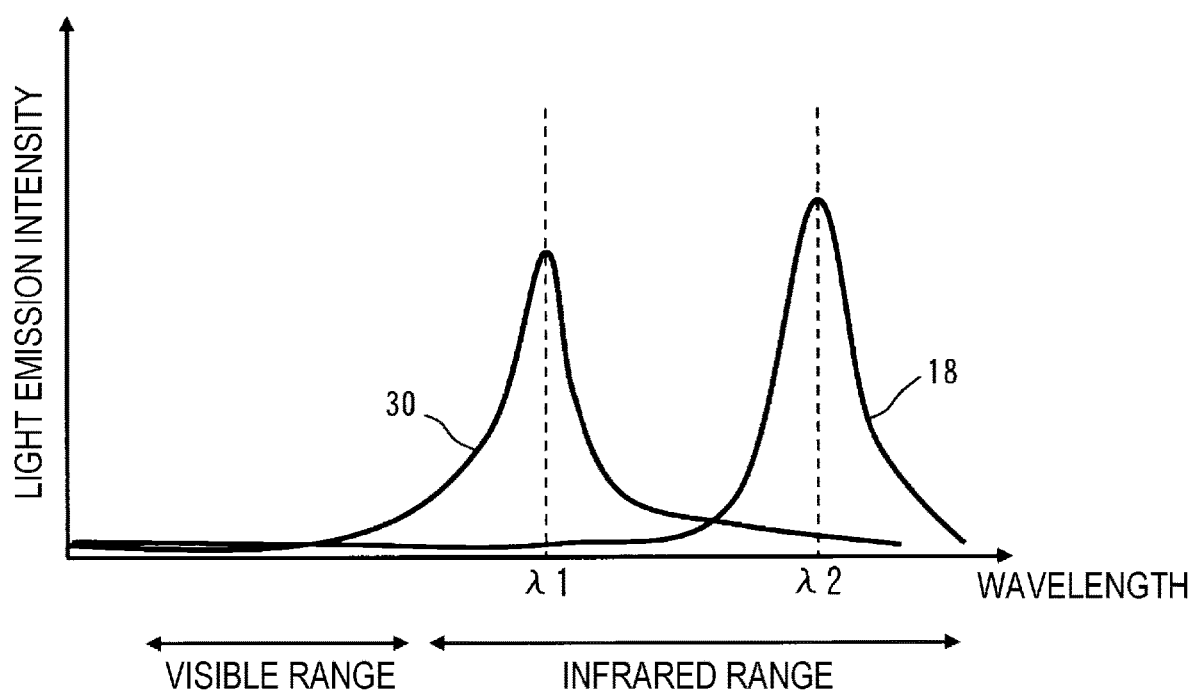
FIG. 4 is a graph illustrating an example of a center wavelength of light emitted by an identifying light emitting element and a center wavelength of light emitted by a for-distance light emitting element.

FIG. 4 is a graph illustrating an example of a center wavelength $\lambda 1$ of light (also referred to as a first infrared ray) emitted by the light source 30 serving as an identifying light emitting element of the tag 14 and a center wavelength $\lambda 2$ of light (also referred to as a second infrared ray) emitted by the for-distance light emitting element 18 of the reader 12. Here, a center wavelength means a wavelength or wavelength range in which the emission intensity of the light is the highest.

As illustrated in FIG. 4, the center wavelength $\lambda 1$ of light emitted by the light source 30 serving as an identifying light emitting element of the tag 14, and the center wavelength $\lambda 2$ of light emitted by the for-distance light emitting element 18 of the reader 12 are both in an infrared range. Thus, both the light rays can be invisible or substantially invisible and are insusceptible to noise from illumination or the like. In addition, there is a predetermined wavelength difference between the center wavelength $\lambda 1$ of the infrared ray emitted by the light source 30 and the center wavelength $\lambda 2$ of the infrared ray emitted by the for-distance light emitting element 18, and thus mutual influence of the infrared ray emitted by the light source 30 and the infrared ray emitted by the for-distance light emitting element 18 is suppressed.

Figure 5A:
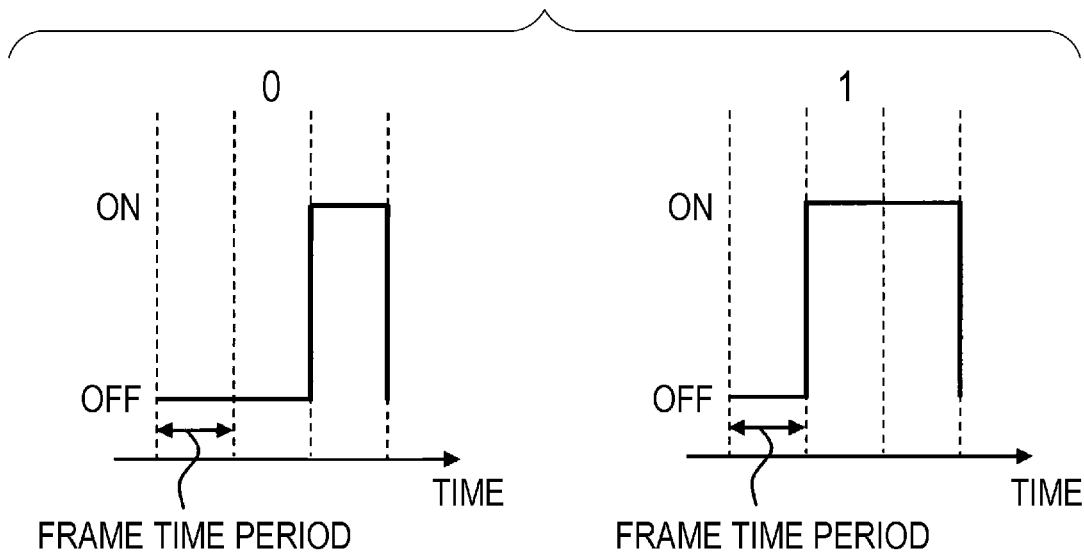
FIG. 5A is a diagram illustrating an example of lighting patterns representing 0 and 1 of a light source of a tag.
Figure 5B:
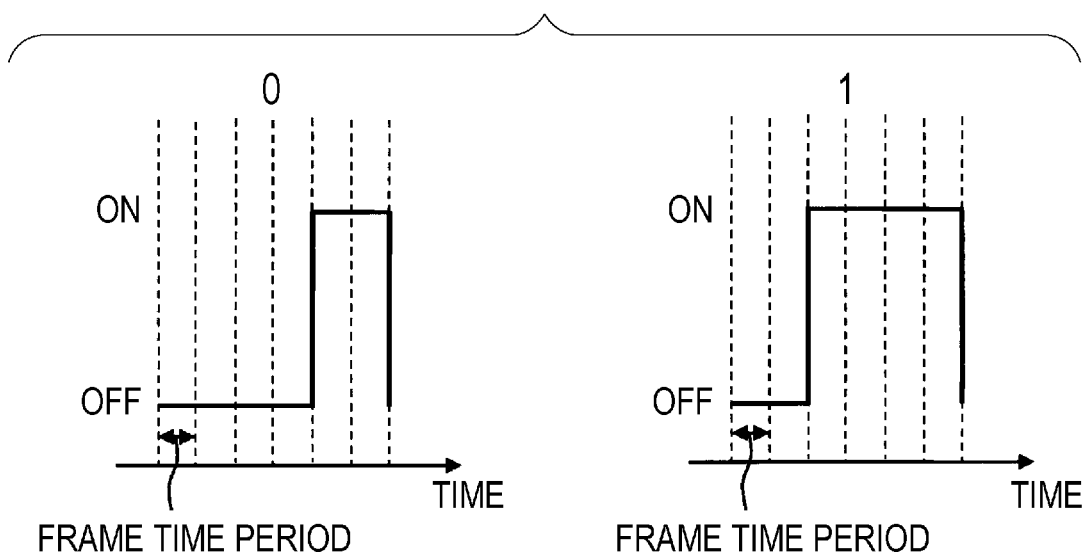
FIG. 5B is a diagram illustrating another example of lighting patterns representing 0 and 1 of the light source of the tag.
Figure 6:
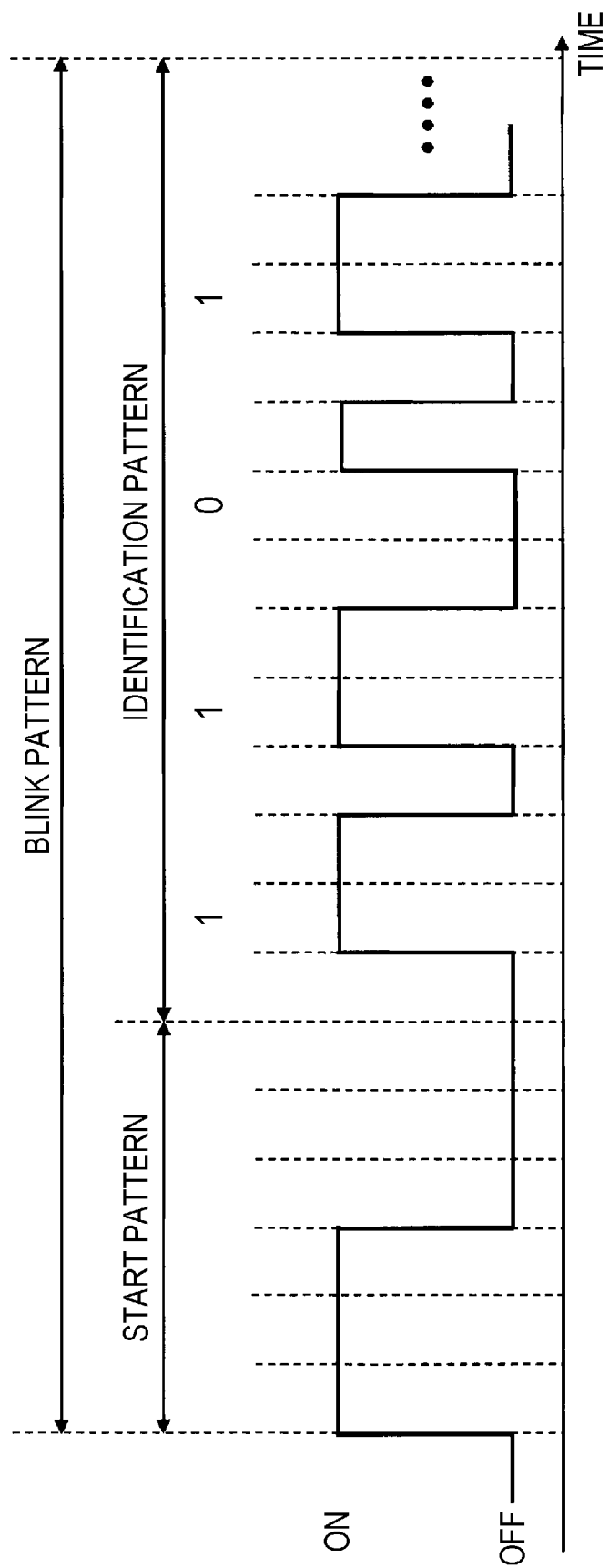
FIG. 6 is a diagram illustrating an example of a blink pattern of the light source of the tag.

Next, a blink pattern of the light source 30 of the tag 14 will be described. FIG. 5A and FIG. 5B are diagrams illustrating examples of lighting patterns representing 0 and 1 of the light source 30 of the tag 14. FIG. 6 is a diagram illustrating an example of a blink pattern of the light source 30 of the tag 14. As illustrated in FIG. 6, the blink pattern includes a start pattern and an identification pattern that directly or indirectly represents the identification information unique to the tag 14. The identification pattern is formed by combining plural lighting patterns representing 0 or 1, and the start pattern is formed of a pattern other than the lighting pattern representing 0 or 1.

As illustrated in FIG. 5A and FIG. 5B, the lighting pattern representing 0 or 1 is represented by using plural frame time periods. A frame time period is a time interval of frame images captured and acquired by the camera 16 of the reader 12. For example, in a case where the camera 16 acquires 30 frame images per second, the frame time period is about 33 milliseconds. FIG. 5A and FIG. 6 illustrate an example of a lighting pattern representing 0 or 1 by using three frame time periods (three times the frame time period). FIG. 5B illustrates an example of a lighting pattern representing 0 or 1 by using six frame time periods (six times the frame time period).

As a result of representing a lighting pattern representing 0 or 1 by using plural frame time periods in this manner, even in a case where one or plural frame images in a lighting pattern representing 0 or 1 have noise or the like and ON or OFF of light of the tag 14 is not identifiable in the frame image or frame images when an image of light emitted by the tag 14 is captured by the camera 16, it may be possible to identify 0 or 1 on the basis of another frame image in the lighting pattern. That is, the lighting pattern representing 0 or 1 has temporal redundancy, and thus noise resistance for identifying 0 or 1 can be increased. In the present exemplary embodiment, the lighting pattern representing 0 or 1 is represented by using plural frame time periods (redundancy is given). Alternatively, the lighting pattern representing 0 or 1 may be represented by using one frame time period (for example, 0 may be represented by OFF and 1 may be represented by ON).

The blink pattern controller 38 of the tag 14 controls the light source 30 such that the light source 30 repeatedly outputs a blink pattern (see FIG. 6) at a predetermined time interval. The tag recognition unit 26 of the reader 12 recognizes the start of the blink pattern when a lighting pattern other than 0 or 1 (start pattern) appears in a captured image, and also recognizes an identification pattern following the start pattern of the blink pattern. Subsequently, the tag recognition unit 26 interprets (decodes) the identification pattern to acquire the identification information 45 of the tag 14. The type of blink pattern is not limited, for example, an end pattern may follow an identification pattern, a pattern for error detection or correction may be added, or a start pattern may be represented by a predetermined pattern of 0 or 1.

Figure 7:
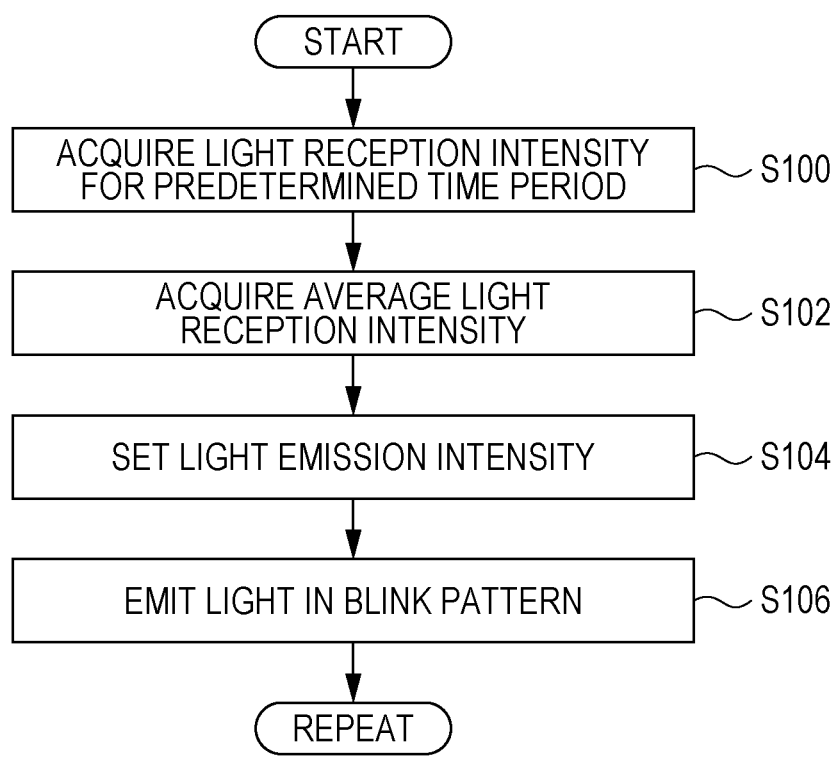
FIG. 7 is a flowchart illustrating a flow of a control operation for the light source of the tag.

Next, control of the light source 30 performed by the processor 34 of the tag 14 will be described. FIG. 7 is a flowchart illustrating a flow of a control operation for the light source 30 of the tag 14. First, in step S100 in FIG. 7, the processor 34 functions as the light reception intensity acquiring unit 42 and acquires the light reception intensity of an infrared ray received by the for-distance light receiving element 32 of the tag 14 for a predetermined time period. Subsequently, in step S102, the light reception intensity acquiring unit 42 acquires an average of the light reception intensity acquired in step S100 as an average light reception intensity.

Figure 8:
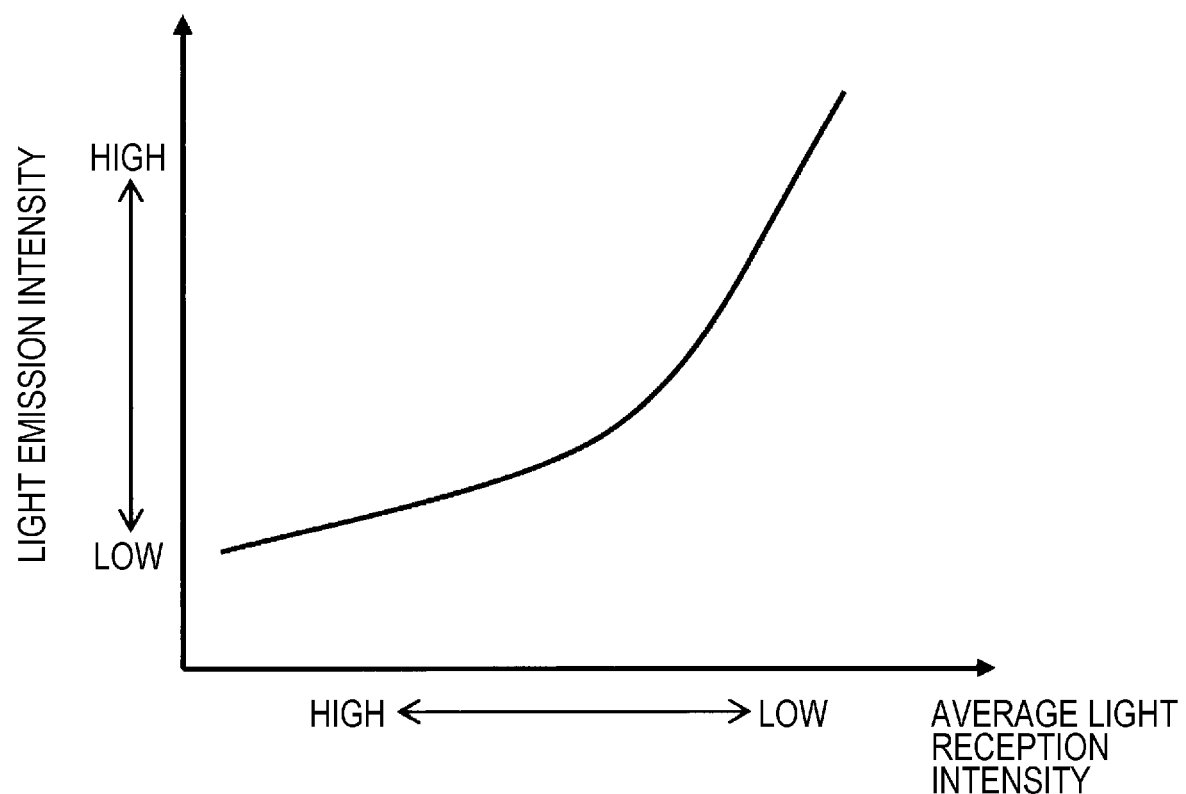
FIG. 8 is a graph illustrating an example of a relationship between an average light reception intensity and a light emission intensity of the tag.

Subsequently, in step S104, the processor 34 functions as the light emission intensity controller 40, and sets the light emission intensity of the light source 30 on the basis of the average light reception intensity acquired in step S102. FIG. 8 is a graph illustrating an example of a relationship between an average light reception intensity and a light emission intensity, used to set the light emission intensity of the light source 30. This relationship may be expressed by, for example, an arithmetic expression, or may be stored as a table in the memory 36. As illustrated in FIG. 8, the light emission intensity controller 40 sets the light emission intensity of the light source 30 such that the light emission intensity of the light source 30 increases as the average light reception intensity decreases. In other words, the light emission intensity controller 40 sets the light emission intensity of the light source 30 such that the light emission intensity of the light source 30 decreases as the average light reception intensity increases.

Subsequently, in step S106, the processor 34 functions as the blink pattern controller 38, reads out the identification information 45 from the memory 36, and controls the light source 30 such that the light source 30 blinks in the blink pattern illustrated in FIG. 6. The blink pattern controller 38 controls the light source 30 such that the blink pattern is repeatedly output at a predetermined time interval.

Figure 9:
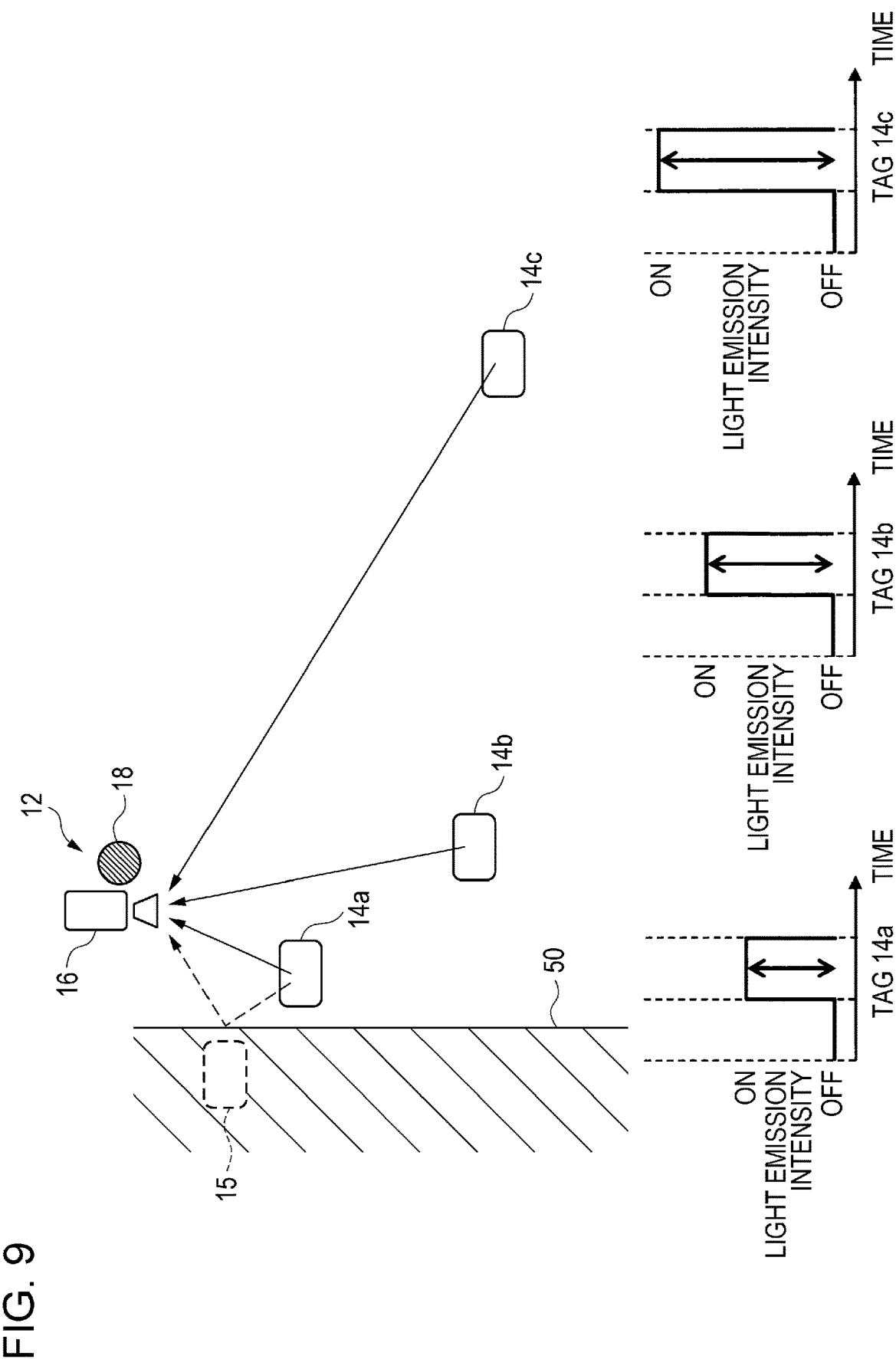
FIG. 9 is a diagram for describing light emission intensities of tags corresponding to the distances between a camera and the tags.

In the tag recognition system 10 (light emitting apparatus recognition system) according to the present exemplary embodiment described above, as illustrated in FIG. 9, the tag 14c located far from the reader 12 receives low-intensity light from the for-distance light emitting element 18 of the reader 12, and thus the light emission intensity of the light source 30 of the tag 14c is set to be high. Accordingly, even when the tag 14c is located far from the reader 12, the light emitted by the light source 30 of the tag 14c appears in a relatively large size and high brightness in an image captured by the camera 16 of the reader 12, and the tag 14c may be easily recognized in the captured image.

On the other hand, the tags 14a and 14b located relatively close to the reader 12 receive high-intensity light from the for-distance light emitting element 18 of the reader 12, and thus the light emission intensities of the light sources 30 of the tags 14a and 14b are set to be relatively low. Thus, the power consumption of the light sources 30 of the tags 14a and 14b may be reduced, and the energy consumption of batteries included in the tags 14a and 14b may be reduced.

When the tag 14a located close to the reader 12 emits light with high intensity, the following issue may occur. When the tag 14a located close to the reader 12 emits high-intensity light, there is a possibility that the light of the tag 14a is reflected by a wall 50 or the like and enters the camera 16 as indicated by a broken-line arrow in FIG. 9, making it difficult to recognize the light of the tag 14a in a captured image. For example, there is a possibility that the position of the tag 14a is wrongly recognized as being located in a portion of the wall 50 in the captured image, as indicated by a wrongly-recognized tag 15 illustrated in FIG. 9. However, in the tag recognition system 10 according to the present exemplary embodiment, the light emission intensity of the tag 14a located close to the reader 12 is set to be low, and thus the occurrence of such an event may be suppressed.

Figure 10:
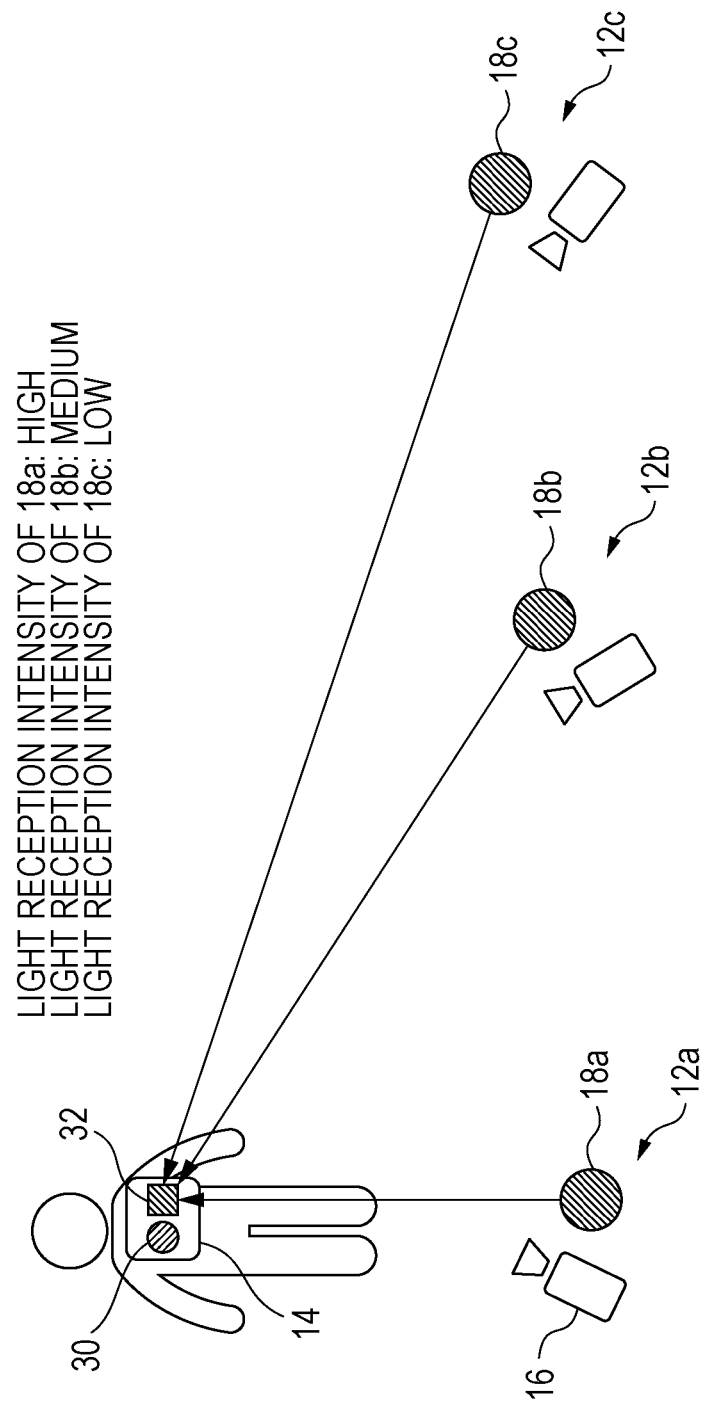
FIG. 10 is a diagram illustrating a schematic configuration of a tag recognition system including plural readers.

Next, a tag recognition system 10 including plural readers 12 will be described. As illustrated in FIG. 10, in a case where there are plural readers 12a, 12b, and 12c, the for-distance light receiving element 32 of the tag 14 receives light (infrared ray) from each of for-distance light emitting elements 18a, 18b, and 18c of the readers 12a, 12b, and 12c. FIG. 10 illustrates, as an example, a mode in which the for-distance light receiving element 32 receives light from each of the three for-distance light emitting elements 18a, 18b, and 18c.

Figure 11:
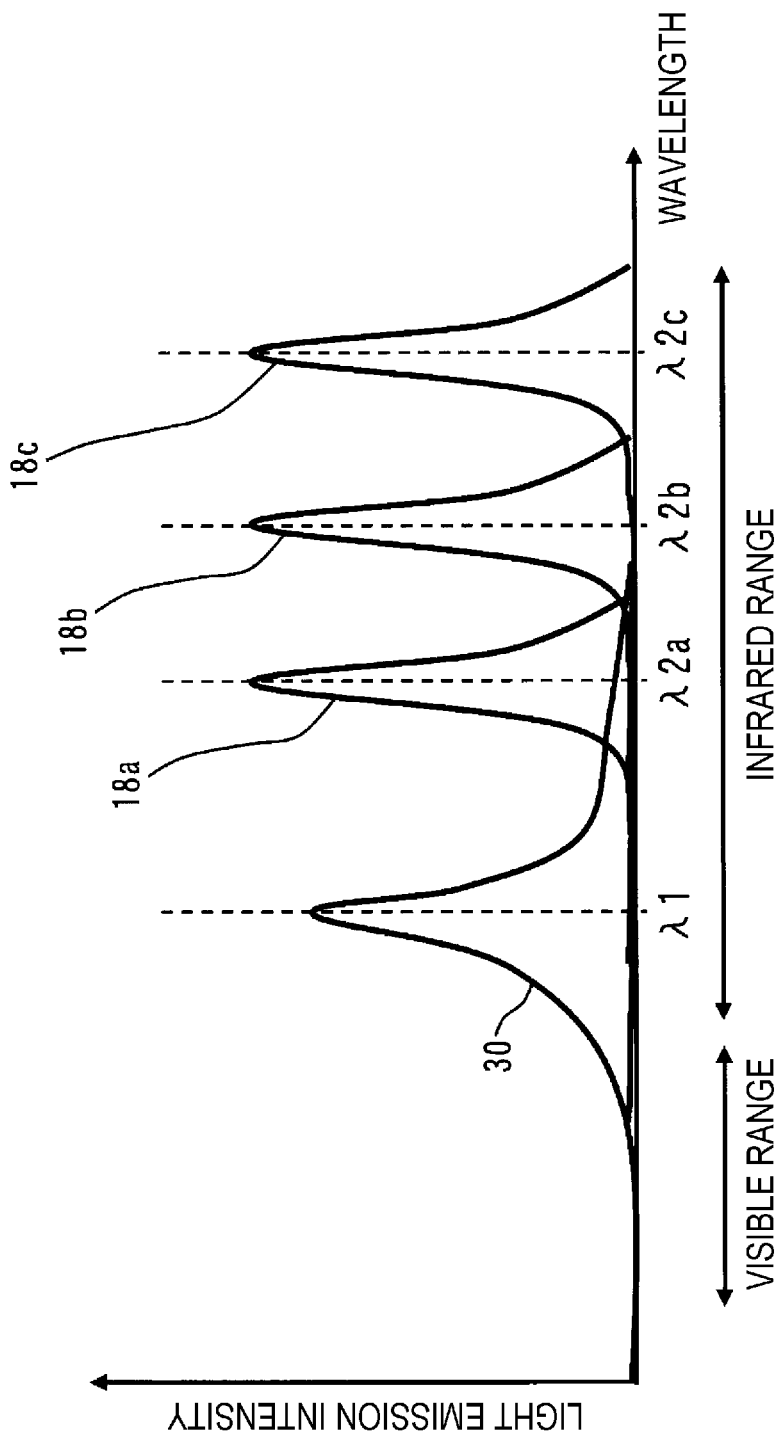
FIG. 11 is a graph illustrating an example of a center wavelength of light emitted by an identifying light emitting element and center wavelengths of light rays emitted by plural for-distance light emitting elements.

FIG. 11 is a graph illustrating an example of a center wavelength λ1 of light emitted by the light source 30 of the tag 14 and center wavelengths λ2a, λ2b, and λ2c of light rays respectively emitted by the for-distance light emitting elements 18a, 18b, and 18c of the three readers 12a, 12b, and 12c. As illustrated in FIG. 11, the center wavelength λ1 of light emitted by the light source 30 and the center wavelengths λ2a, λ2b, and λ2c of light rays emitted by the for-distance light emitting elements 18a, 18b, and 18c are in the infrared range. Thus, the individual light rays can be invisible or substantially invisible and are insusceptible to noise from illumination or the like. In addition, there is at least a predetermined wavelength difference between adjacent center wavelengths among the center wavelength λ1 of an infrared ray emitted by the light source 30 and the center wavelengths λ2a, λ2b, and λ2c of infrared rays emitted by the for-distance light emitting elements 18a, 18b, and 18c. Thus, mutual influence of an infrared ray emitted by the light source 30 and infrared rays emitted by the for-distance light emitting elements 18a, 18b, and 18c is suppressed. The center wavelengths of the for-distance light emitting elements 18a, 18b, and 18c are respectively set by the emission wavelength controllers 28 (see FIG. 3) of the readers 12a, 12b, and 12c. The light emission intensities of infrared rays of the for-distance light emitting elements 18a, 18b, and 18c are set to be equal or substantially equal to each other.

As illustrated in FIG. 10, the light reception intensity of an infrared ray received by the for-distance light receiving element 32 of the tag 14 is highest in the infrared ray emitted by the for-distance light emitting element 18a closest to the tag 14, is lowest in the infrared ray emitted by the for-distance light emitting element 18c farthest from the tag 14, and is medium in the infrared ray emitted by the for-distance light emitting element 18b that is farther than the for-distance light emitting element 18a from the tag 14 and closer than the for-distance light emitting element 18c to the tag 14. The light emission intensity of the light source 30 of the tag 14 may be set by using, as a reference, the light reception intensity of an infrared ray emitted by any of the for-distance light emitting elements 18a, 18b, and 18c. Hereinafter, two exemplary embodiments will be described regarding the setting of the light emission intensity of the light source 30 of the tag 14 in a case where the tag 14 receives infrared rays from plural readers.

Figure 12:
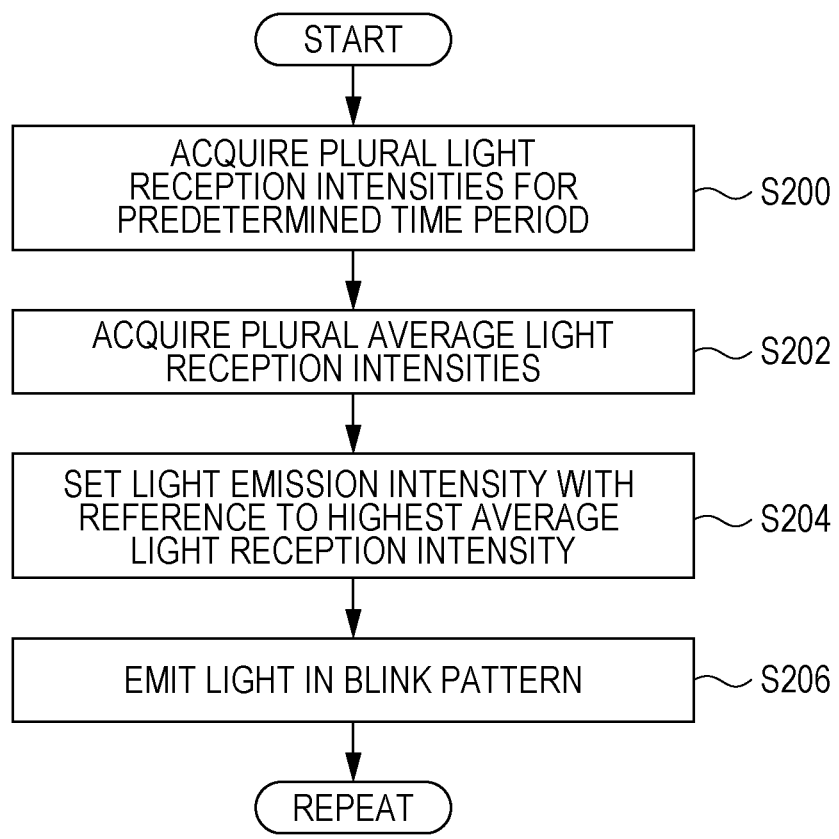
FIG. 12 is a flowchart illustrating a control operation for a light source of a tag in the tag recognition system including plural readers.

FIG. 12 is a flowchart illustrating a control operation for the light source 30 of the tag 14 in the tag recognition system including plural readers. First, in step S200 in FIG. 12, the processor 34 of the tag 14 (see FIG. 3) functions as the light reception intensity acquiring unit 42 and acquires the light reception intensities of individual infrared rays having different center wavelengths and received by the for-distance light receiving element 32 of the tag 14 from the plural for-distance light emitting elements 18a, 18b, and 18c for a predetermined time period. The light reception intensity acquiring unit 42 performs wavelength decomposition on the light received by the for-distance light receiving element 32, thereby acquiring the light reception intensities of individual infrared rays having different center wavelengths of the plural for-distance light emitting elements 18a, 18b, and 18c. In step S202, the light reception intensity acquiring unit 42 acquires averages of the individual light reception intensities acquired in step S200 as individual average light reception intensities.

Subsequently, in step S204, the processor 34 functions as the light emission intensity controller 40, and sets the light emission intensity of the light source 30 on the basis of the highest average light reception intensity among the average light reception intensities acquired in step S202. That is, the light emission intensity controller 40 sets the light emission intensity of the light source 30 on the basis of the average light reception intensity of the infrared ray received from the reader closest to the tag 14. In FIG. 10, the light emission intensity of the light source 30 is set on the basis of the intensity of the infrared ray received from the for-distance light emitting element 18a included in the reader 12a.

Subsequently, in step S206, the processor 34 functions as the blink pattern controller 38, reads out the identification information 45 from the memory 36, and controls the light source 30 such that the light source 30 blinks in the blink pattern illustrated in FIG. 6.

As a result of controlling the light source 30 of the tag 14 in the manner described above, the light emission intensity of the tag 14 is set to be relatively low with reference to the for-distance light emitting element 18a of the reader 12a closest to the tag 14, and thus the power consumption of the light source 30 of the tag 14 may be reduced. Even in this case where the light emission intensity of the tag 14 is low, the light emitted by the light source 30 of the tag 14 is recognizable in an image captured by the camera 16 because the distance between the tag 14 and the camera 16 of the reader 12a is short. The above-described control operation may be referred to as an energy saving mode.

Figure 13:
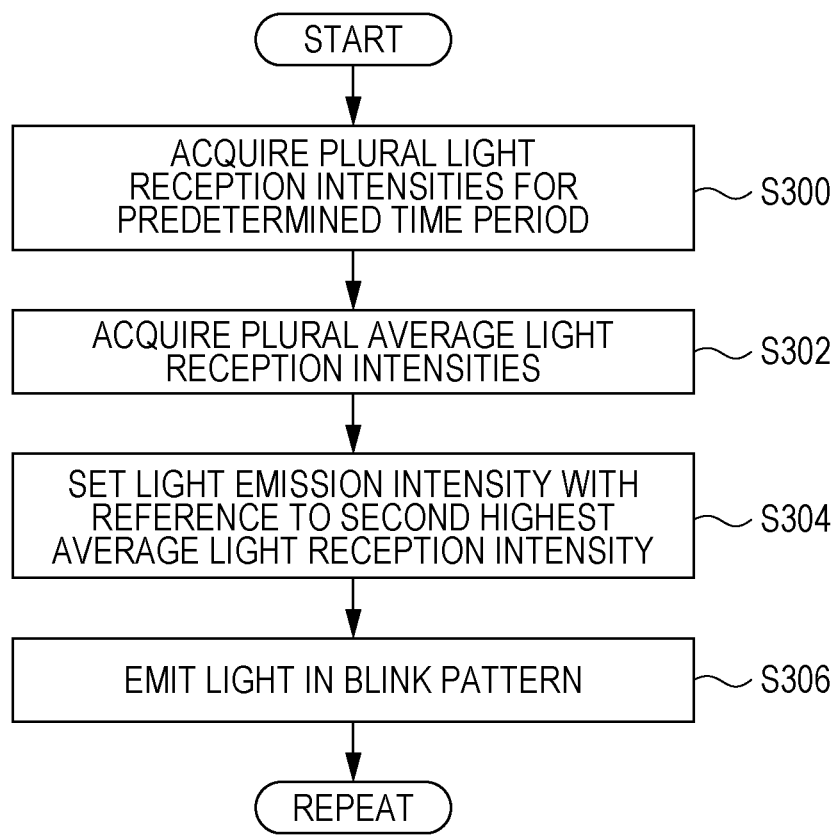
FIG. 13 is a flowchart illustrating another control operation for the light source of the tag in the tag recognition system including plural readers.

FIG. 13 is a flowchart illustrating another control operation for the light source 30 of the tag 14 in the tag recognition system including plural readers. The flow in FIG. 13 is different from the flow in FIG. 12 in that step S204 in FIG. 12 "set light emission intensity with reference to highest average light reception intensity" is replaced with step S304 in FIG. 13 "set light emission intensity with reference to second highest average light reception intensity". That is, the light emission intensity of the light source 30 is set on the basis of the average light reception intensity of the infrared ray received from the reader that is second closest to the tag 14 (in FIG. 10, the reader 12b (the for-distance light emitting element 18b)). As a result of performing this control operation, the light emitted by the light source 30 of the tag 14 clearly appears in an image captured by the camera 16 of the reader closest to the tag 14 (in FIG. 10, the reader 12a) and an image captured by the camera 16 of the reader second closest to the tag 14 (in FIG. 10, the reader 12b). On the basis of these two captured images, the position of the tag 14 can be specified with high accuracy. This control operation may be referred to as a high accuracy mode.

In a case where the for-distance light receiving element 32 of the tag 14 receives infrared rays from the for-distance light emitting elements of many readers, the light emission intensity of the light source 30 may be set on the basis of the intensity (average light reception intensity) of the infrared ray received from the reader (for-distance light emitting element) that is n-th closest to the tag 14 (n is an integer equal to or greater than 3). In this case, the light emitted by the light source 30 of the tag 14 clearly appears in n captured images, and the position of the tag 14 can be specified with higher accuracy on the basis of these captured images.

Figure 14:
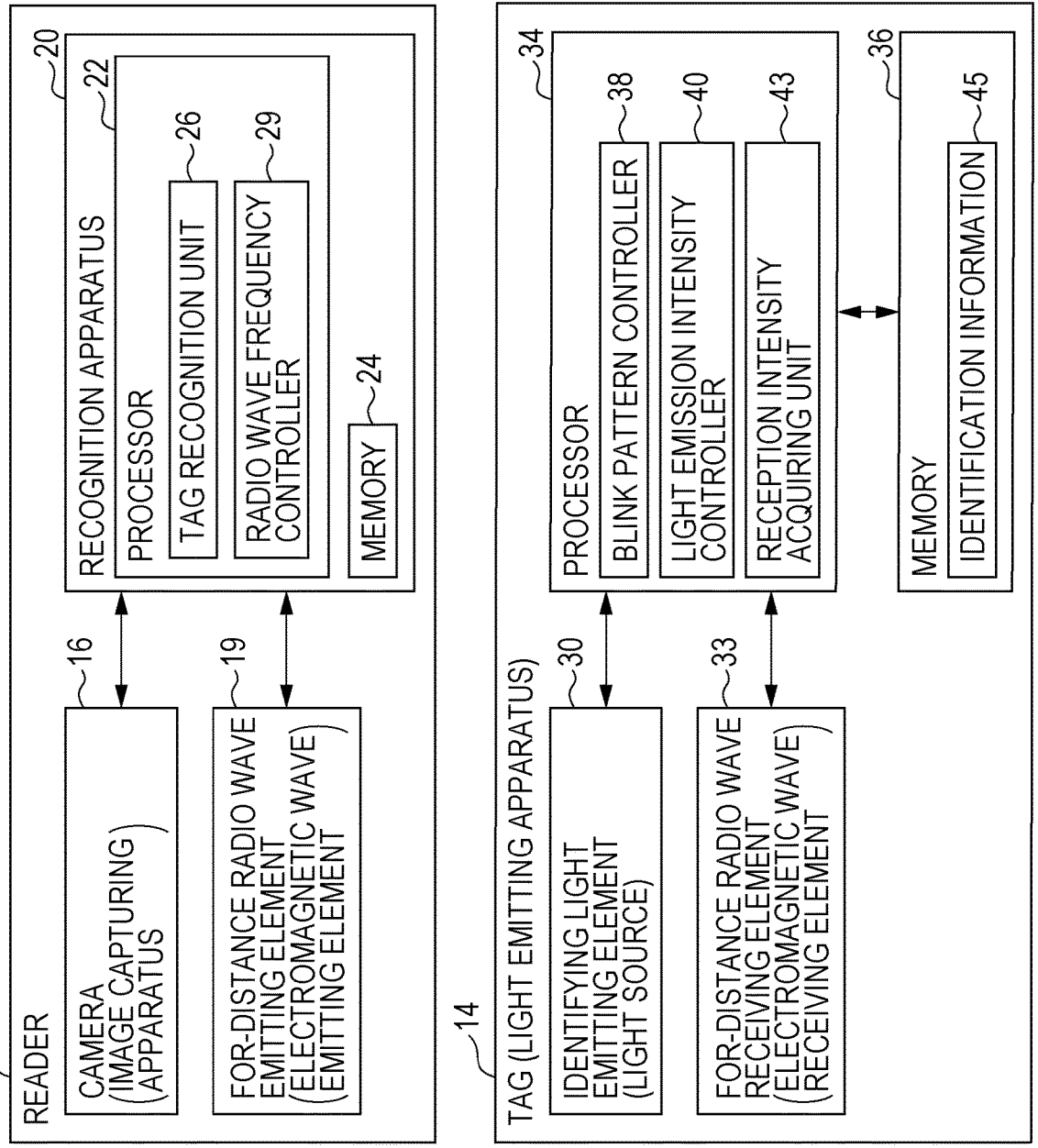
FIG. 14 is a block diagram of a tag recognition system according to another exemplary embodiment.

Next, a tag recognition system according to another exemplary embodiment will be described. In the tag recognition system according to the above-described exemplary embodiment, the reader including the for-distance light emitting element emits an infrared ray to be received by the tag. Alternatively, the reader may emit a radio wave in a predetermined frequency band, which is a kind of electromagnetic wave, instead of an infrared ray. In addition, the tag may receive the radio wave from the reader and change the light emission intensity of the light source 30 in accordance with the intensity of the received radio wave. FIG. 14 is a block diagram of the tag recognition system according to the other exemplary embodiment. The block diagram in FIG. 14 is different from the block diagram in FIG. 3 in that, in FIG. 14, the for-distance light emitting element 18 in FIG. 3 is replaced with a for-distance radio wave emitting element 19, the emission wavelength controller 28 in FIG. 3 is replaced with a radio wave frequency controller 29 that controls emission of a radio wave, the for-distance light receiving element 32 in FIG. 3 is replaced with a for-distance radio wave receiving element 33, and the light reception intensity acquiring unit 42 in FIG. 3 is replaced with a reception intensity acquiring unit 43.

The for-distance radio wave emitting element 19 in FIG. 14, which is an element that emits an electromagnetic wave, has a function similar to that of the for-distance light emitting element 18 in FIG. 3 except that a radio wave is handled instead of an infrared ray, and emits a radio wave (a kind of electromagnetic wave) from the camera 16 of the reader 12 or the vicinity of the camera 16. The radio wave frequency controller 29 in FIG. 14 has a function similar to that of the emission wavelength controller 28 in FIG. 3 except that a radio wave is handled instead of an infrared ray, and controls the frequency of a radio wave emitted by the for-distance radio wave emitting element 19. The for-distance radio wave receiving element 33 in FIG. 14, which is an element that receives an electromagnetic wave, has a function similar to that of the for-distance light receiving element 32 in FIG. 3 except that a radio wave is handled instead of an infrared ray, and receives a radio wave from the for-distance radio wave emitting element 19 of the reader 12. The reception intensity acquiring unit 43 in FIG. 14 has a function similar to that of the light reception intensity acquiring unit 42 in FIG. 3 except that a radio wave is handled instead of an infrared ray, and acquires the reception intensity of a radio wave received by the for-distance radio wave receiving element 33 from the reader 12 (the for-distance radio wave emitting element 19). The light emission intensity controller 40 in FIG. 14 changes the light emission intensity of the light source 30 on the basis of the reception intensity acquired by the reception intensity acquiring unit 43. The radio wave emitted by the for-distance radio wave emitting element 19 of the reader 12 may be, for example, a radio wave of Wi-Fi (registered trademark), Bluetooth (registered trademark) Low Energy, or the like. Also in the other exemplary embodiment described above, it is possible to obtain a function and effect similar to those of the above-described exemplary embodiment in which the reader (for-distance light emitting element) emits an infrared ray for the tag.

In the above-described individual exemplary embodiments, the light source 30 of the tag 14 emits an infrared ray, and the electromagnetic wave emitting element (the for-distance light emitting element 18 or the for-distance radio wave emitting element 19) of the reader 12 emits an infrared ray or a radio wave. Alternatively, the light source 30 of the tag 14 may emit visible light (a kind of electromagnetic wave) instead of an infrared ray, and also the electromagnetic wave emitting element of the reader 12 may emit visible light instead of an infrared ray or a radio wave.

In the above-described individual exemplary embodiments, the tag recognition unit 26 of the recognition apparatus 20 (see FIG. 3 and FIG. 14) identifies the tag 14 in a captured image and specifies the position of the tag 14. Alternatively, the tag recognition unit 26 may be configured to identify the tag 14 in a captured image and not to specify the position of the tag 14. In this specification, "recognition of the tag (light emitting apparatus)" may include identification of the tag in a captured image and may not include specification of the position of the tag. The "tag recognition system (light emitting apparatus recognition system)" includes a system that identifies a tag (light emitting apparatus) in a captured image and that does not specify the position of the tag (light emitting apparatus).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light emitting apparatus recognition system comprising:
    a light emitting apparatus including a light source that blinks based on identification information unique to the light emitting apparatus;
    an image capturing apparatus that captures an image of light emitted by the light source of the light emitting apparatus;
    a recognition apparatus that recognizes the light emitting apparatus based on the light appearing in the image captured by the image capturing apparatus; and
    an electromagnetic wave emitting element that emits an electromagnetic wave from the image capturing apparatus or a vicinity of the image capturing apparatus, wherein
    the light emitting apparatus further includes an electromagnetic wave receiving element that receives the electromagnetic wave emitted by the electromagnetic wave emitting element, and
    the light emitting apparatus changes a light emission intensity of the light source in accordance with an intensity of the electromagnetic wave received by the electromagnetic wave receiving element,
    wherein the light emitting apparatus decreases the light emission intensity of the light source as the intensity of the electromagnetic wave received by the electromagnetic wave receiving element increases.

2. The light emitting apparatus recognition system according to claim 1, wherein
    the light emitted by the light emitting apparatus is a first infrared ray, and
    the electromagnetic wave emitted by the electromagnetic wave emitting element is a second infrared ray having a center wavelength different from a center wavelength of the first infrared ray.

3. The light emitting apparatus recognition system according to claim 1, wherein
    the light emitted by the light emitting apparatus is a first infrared ray, and
    the electromagnetic wave emitted by the electromagnetic wave emitting element is a second infrared ray having a center wavelength different from a center wavelength of the first infrared ray.

4. The light emitting apparatus recognition system according to claim 1, wherein
    the light emitted by the light emitting apparatus is an infrared ray, and
    the electromagnetic wave emitted by the electromagnetic wave emitting element is a radio wave.

5. The light emitting apparatus recognition system according to claim 1, wherein
    the light emitted by the light emitting apparatus is an infrared ray, and
    the electromagnetic wave emitted by the electromagnetic wave emitting element is a radio wave.

6. The light emitting apparatus recognition system according to claim 1, comprising
    a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a highest intensity among the electromagnetic waves received by the electromagnetic wave receiving element.

7. The light emitting apparatus recognition system according to claim 1, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a highest intensity among the electromagnetic waves received by the electromagnetic wave receiving element.

8. The light emitting apparatus recognition system according to claim 2, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a highest intensity among the electromagnetic waves received by the electromagnetic wave receiving element.

9. The light emitting apparatus recognition system according to claim 3, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a highest intensity among the electromagnetic waves received by the electromagnetic wave receiving element.

10. The light emitting apparatus recognition system according to claim 4, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a highest intensity among the electromagnetic waves received by the electromagnetic wave receiving element.

11. The light emitting apparatus recognition system according to claim 5, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a highest intensity among the electromagnetic waves received by the electromagnetic wave receiving element.

12. The light emitting apparatus recognition system according to claim 1, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a second highest intensity among the electromagnetic waves received by the electromagnetic wave receiving element.

13. The light emitting apparatus recognition system according to claim 1, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a second highest intensity among the electromagnetic waves received by the electromagnetic wave receiving element.

14. The light emitting apparatus recognition system according to claim 2, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a second highest intensity among the electromagnetic waves received by the electromagnetic wave receiving element.

15. The light emitting apparatus recognition system according to claim 3, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a second highest intensity among the electromagnetic waves received by the electromagnetic wave receiving element.

16. The light emitting apparatus recognition system according to claim 4, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a second highest intensity among the electromagnetic waves received by the electromagnetic wave receiving element.

17. The light emitting apparatus recognition system according to claim 5, comprising a plurality of pairs of the image capturing apparatus and the electromagnetic wave emitting element, wherein the electromagnetic waves emitted by the respective plurality of electromagnetic wave emitting elements have center wavelengths different from each other, and the light emitting apparatus changes the light emission intensity of the light source in accordance with an electromagnetic wave having a second highest intensity among the electromagnetic waves received by the electromagnetic wave receiving element.

18. A light emitting apparatus comprising:

a light source that blinks based on identification information unique to the light emitting apparatus; and an electromagnetic wave receiving element that receives an electromagnetic wave emitted from an image capturing apparatus or a vicinity of the image capturing apparatus, the image capturing apparatus capturing an image of light emitted by the light source, wherein the light emitting apparatus changes a light emission intensity of the light source in accordance with an intensity of the electromagnetic wave received by the electromagnetic wave receiving element, wherein the light emitting apparatus decreases the light emission intensity of the light source as the intensity of the electromagnetic wave received by the electromagnetic wave receiving element increases.

19. A light emitting apparatus recognition system comprising:

light emitting means including a light source that blinks based on identification information unique to the light emitting means;

image capturing means for capturing an image of light emitted by the light source of the light emitting means;

recognition means for recognizing the light emitting means based on the light appearing in the image captured by the image capturing means; and electromagnetic wave emitting means for emitting an electromagnetic wave from the image capturing means or a vicinity of the image capturing means, wherein the light emitting means further includes electromagnetic wave receiving means for receiving the electromagnetic wave emitted by the electromagnetic wave emitting means, and the light emitting means changes a light emission intensity of the light source in accordance with an intensity of the electromagnetic wave received by the electromagnetic wave receiving means, wherein the light emitting apparatus decreases the light emission intensity of the light source as the intensity of the electromagnetic wave received by the electromagnetic wave receiving element increases.

\* \* \* \* \*